US011868282B1

(12) United States Patent
Sonksen et al.

(10) Patent No.: US 11,868,282 B1
(45) Date of Patent: Jan. 9, 2024

(54) NETWORK DEVICE USING CACHE TECHNIQUES TO PROCESS CONTROL SIGNALS

(71) Applicant: Marvell Asia Pte Ltd, Singapore (SG)

(72) Inventors: Bradley Sonksen, Rancho Santa Margarita, CA (US); Paul Nitza, Sharpsburg, MD (US)

(73) Assignee: Marvell Asia Pte Ltd, Singapore (SG)

( * ) Notice: Subject to any disclaimer, the term of this patent is extended or adjusted under 35 U.S.C. 154(b) by 8 days.

(21) Appl. No.: 17/698,196

(22) Filed: Mar. 18, 2022

Related U.S. Application Data

(60) Provisional application No. 63/164,371, filed on Mar. 22, 2021.

(51) Int. Cl.
*G06F 13/16* (2006.01)
*G06F 12/0831* (2016.01)

(52) U.S. Cl.
CPC ...... *G06F 13/1642* (2013.01); *G06F 12/0831* (2013.01); *G06F 13/1668* (2013.01)

(58) Field of Classification Search
CPC ............. G06F 13/1642; G06F 12/0831; G06F 13/1668
USPC ........................................................ 711/154
See application file for complete search history.

(56) References Cited

U.S. PATENT DOCUMENTS

| | | | |
|---|---|---|---|
| 2003/0056032 A1* | 3/2003 | Micalizzi, Jr. | G06F 13/126 710/5 |
| 2005/0273672 A1* | 12/2005 | Konda | G06F 11/3636 714/45 |
| 2008/0301328 A1* | 12/2008 | Russ | G06F 13/126 710/25 |
| 2019/0384733 A1* | 12/2019 | Jen | H04L 69/323 |
| 2020/0004460 A1* | 1/2020 | Gould | G06F 3/0613 |

* cited by examiner

*Primary Examiner* — Arpan P. Savla
*Assistant Examiner* — Sidney Li

(57) ABSTRACT

A network controller for coupling a host device to a data network, in accordance with network command blocks initiated in a request queue in the host device, includes a channel interface configured to couple to the data network, where the channel interface includes memory configured to store the network command blocks and processing circuitry configured to execute the network command blocks to move data between the host device and the data network, and a host interface configured to couple the network controller to the host device, and to move the network command blocks from the request queue in the host device to the memory using cache operations, including fetching one of the network command blocks from the request queue upon receipt from the host device of a message advising that a request queue location has changed.

16 Claims, 4 Drawing Sheets

NETWORK DEVICE USING CACHE TECHNIQUES TO PROCESS CONTROL SIGNALS

CROSS REFERENCE TO RELATED APPLICATIONS

This disclosure claims the benefit of copending, commonly-assigned U.S. Provisional Patent Application No. 63/164,371, filed Mar. 22, 2021, which is hereby incorporated by reference herein in its entirety.

FIELD OF USE

This disclosure relates to a network device using cache techniques to process control signals. More particularly, this disclosure relates to a network device that uses cache techniques to receive notifications from a host that the host has input/output control commands for the network device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Network devices, such as network controllers that couple a host device to a network link (e.g., an Ethernet or Fibre Channel link), transfer data between the host device and the channel based on input/output control commands initiated by the host device, instructing the network device to send data to a destination on the channel, or to retrieve data from a destination on the channel. Those input/output control commands may be in the form of input/output control blocks (IOCBs).

Typically, the host device maintains a Request Queue (e.g., a circular buffer) of IOCBs to be processed, while the network device maintains an "In-Pointer" queue identifying IOCBs to be processed, and an "Out-Pointer" queue identifying IOCBs that have been processed. The request queue is empty when the In-Pointer location is the same as the Out-Pointer location, and the queue is full when the In-Pointer location is equal to one less than the Out-Pointer location (accounting for wraparound in the circular buffer).

When the host device has a new IOCB to be processed by the network device, the host typically signals the network device (using, e.g., a "doorbell" transaction, which is a form of interrupt) to update the In-Pointer. After updating the In-Pointer, the network device issues a DMA request to the host to retrieve the new IOCB. The network device processes the IOCB, and updates the Out-Pointer.

That process adds significant latency to the command flow. First, there is a round-trip delay introduced by the doorbell transaction and the resulting DMA request. Second, the network device typically cannot issue the DMA request for the IOCB until the In-Pointer is written, which could include a write delay of about 1 ps. Those delays add to overall latency of the required protocol layers, the host memory read latency, and any memory management delay that may be required to translate between physical and virtual address domains.

SUMMARY

In accordance with implementations of the subject matter of this disclosure, a network controller for coupling a host device to a data network, in accordance with network command blocks initiated in a request queue in the host device, includes a channel interface configured to couple to the data network, the channel interface including memory configured to store the network command blocks and processing circuitry configured to execute the network command blocks to move data between the host device and the data network, and a host interface configured to couple the network controller to the host device, and to move the network command blocks from the request queue in the host device to the memory using cache operations, including fetching one of the network command blocks from the request queue upon receipt from the host device of a message advising that a request queue location has changed.

In a first implementation of such a network controller, the host interface may be configured to maintain cached In-pointers corresponding to locations in the host device request queue, and the host interface may be configured to fetch one of the network command blocks upon receipt from the host device of a message that one of the cached In-pointers has been changed.

According to a first aspect of that first implementation, the host interface may be configured to fetch one of the network command blocks upon receipt from the host device of a cache snoop invalidate request message signifying that one of the cached In-pointers has been changed.

According to a second aspect of that first implementation, the host interface may be configured to receive from the host device a message that a plurality of the cached In-pointers have been changed, and to fetch a corresponding plurality of the network command blocks.

According to a third aspect of that first implementation, the host interface may further be configured to maintain Out-pointers corresponding to network command blocks that have been transferred, and the host interface may be configured to, upon completion of a transfer of a network command block, update, in the Out-pointers, an Out-pointer corresponding to the network command block that was transferred.

In one instance of that third aspect, the host interface may further be configured to update additional Out-pointers in the host device.

In a second implementation of such a network controller, the host interface may be configured to operate under a cache protocol.

According to one aspect of that second implementation, the host interface may be configured to operate under a CXL.cache protocol.

In accordance with implementations of the subject matter of this disclosure, a method of operating a network controller to couple a host device to a data network, in accordance with network command blocks initiated in a request queue in the host device, includes coupling a channel interface of the network controller to the data network, the channel interface including memory configured to store the network command blocks, and processing circuitry configured to execute the network command blocks to move data between the host device and the data network, coupling a host interface of the network controller to the host device, and moving the network command blocks from the request queue in the host device to the memory using cache operations, including fetching one of the network command blocks from the request queue upon receipt from the host device of a message advising that a request queue location has changed.

A first implementation of such a method includes maintaining cached In-pointers corresponding to locations in the host device request queue, and fetching one of the network command blocks upon receipt from the host device of a message that one of the cached In-pointers has been changed.

According to a first aspect of that first implementation, the method may include fetching one of the network command blocks upon receipt from the host device of a cache snoop invalidation request signifying that one of the cached In-pointers has been changed.

According to a second aspect of that first implementation, the method may include fetching a plurality of the network command blocks upon receipt from the host device of a message that a plurality of the cached In-pointers have been changed.

According to a third aspect of that first implementation, the method may include maintaining at the host interface Out-pointers corresponding to network command blocks that have been transferred, and upon completion of a transfer of a network command block, updating, in the Out-pointers, an Out-pointer corresponding to the network command block that was transferred.

In one instance of that third aspect, the method may further include updating additional Out-pointers in the host device.

A second implementation of such a method may include operating the host interface under a cache protocol.

According to one aspect of that second implementation, the method may include operating the host interface under a CXL.cache protocol.

According to implementations of the subject matter of this disclosure, a network system includes a host device configured to initiate network command blocks and to store the network command blocks in a request queue in the host device, and a network controller for coupling the host device to a data network in accordance with the network command blocks, where the network controller includes a channel interface configured to couple to the data network, the channel interface including memory configured to store the network command blocks, and processing circuitry configured to execute the network command blocks to move data between the host device and the data network, and a host interface configured to couple the network controller to the host device, and to move the network command blocks from the host device to the memory using cache operations, including fetching one of the network command blocks from the request queue upon receipt from the host device of a message advising that a request queue location has changed.

In a first implementation of such a network system, the host interface may be configured to maintain cached In-pointers corresponding to locations in the host device request queue, the host device may be configured to, upon entering a new network command block into the host device request queue, send to the host interface a message indicating that one of the cached In-pointers has been changed, and the host interface may be configured to fetch one of the network command blocks upon receipt from the host device of the message that one of the cached In-pointers has been changed.

According to a first aspect of that first implementation, the host device may configured to, upon entering a new network command block into the host device request queue, send to the host interface a cache snoop invalidation request message indicating that one of the cached In-pointers has been changed, and the host interface may be configured to fetch one of the network command blocks upon receipt from the host device of the cache snoop invalidation request message signifying that one of the cached in-pointers has been changed.

According to a second aspect of that first implementation, the host device may be configured to, upon entering a plurality of new network command blocks into the host device request queue, send to the host interface a corresponding plurality of cache snoop invalidation request messages, each respective cache snoop invalidation request message indicating that a respective one of the cached In-pointers has been changed, and the host interface may be configured to fetch a corresponding plurality of the network command blocks upon receipt from the host device of the plurality of cache snoop invalidation request messages.

In a second implementation of such a network system, the host interface may operates under a cache protocol.

According to one aspect of that second implementation, the host interface may operates under a CXL.cache protocol.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
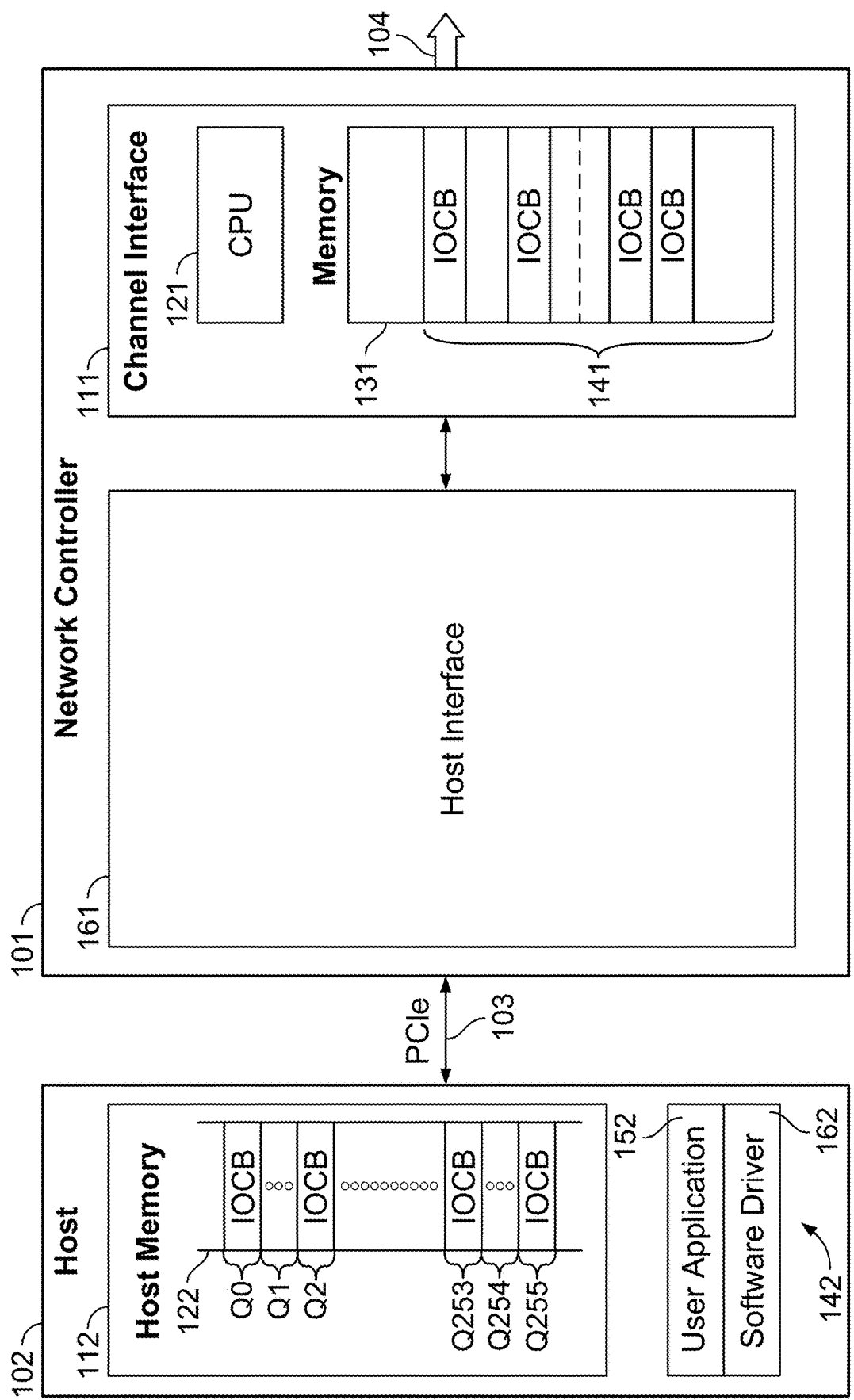
FIG. 1 is a block diagram of a network controller device in accordance with implementations of the subject matter of this disclosure.

As noted above, when a host device has a new IOCB to be processed by a network device, the host typically signals the network device (using, e.g., a "doorbell" transaction, which is a form of interrupt) to update the In-Pointer. After updating the In-Pointer, the network device issues a DMA request to the host to retrieve the new IOCB. The network device processes the IOCB, and updates the Out-Pointer.

That process adds significant latency to the command flow. First, there is a round-trip delay introduced by the doorbell transaction and the resulting DMA request. Second, the network device typically cannot issue the DMA request for the IOCB until the In-Pointer is written, which could include a write delay of about 1 ps. Those delays add to overall latency of the required protocol layers, the host memory read latency, and any memory management delay that may be required to translate between physical and virtual address domains.

In accordance with implementations of the subject matter of this disclosure, latency in the processing of IOCBs is reduced by treating the IOCB request queue in the host device in a manner similar to a cache. For example, network controller devices typically communicate with host devices using the Peripheral Component Interconnect Express (PCIe) protocol. In accordance with implementations of the subject matter of this disclosure, a cache coherence protocol, such as the CXL.cache extension of the Compute Express Link™ (CXL™) protocol administered by the CXL Consortium, of Beaverton, Oregon, USA, which operates on top of the PCIe protocol, may be used to eliminate some of the signaling between the host device and the network controller device when a new IOCB is available for processing.

Specifically, the IOCB request queue in the host device may be treated by the network device in a manner similar to a cache. Thus the network device may issue a cache snoop command to the host IOCB request queue. As a result, the host IOCB request queue automatically issues a snoop invalidate request message whenever the contents of the IOCB request queue change, advising a controller in the network device that a particular "cache line"—i.e., queue location—is no longer valid. The network device may then issue a read request in response to the new contents of that "cache line"—i.e., the new In-pointer value, and based on the value of the updated In-pointer, the new IOCB or IOCBs to be processed. According to the CXL.cache protocol specification, the snoop invalidate request message and the read request have latencies on the order of tens of nanoseconds, substantially faster than the microsecond latencies (thousands of nanoseconds) of the doorbell transaction and DMA request previously used.

Conceptually, IOCBs may be processed, in implementations of the subject matter of this disclosure, by having a network device snoop the request queue as though it were a cache. Thus, after a host device writes one or more IOCBs to a request queue in host memory, the host updates the request queue In-pointer or In-pointers in host memory. The network device, which has snooped a "cache" line associated with the request queue In-pointer, is notified via the snoop invalidate request message that the request queue In-pointer has been modified. The network device then pulls the IOCB or IOCBs from the request queue in the host memory, without the need for a DMA request. The transfer may occur using the CXL.cache extension. The network device then updates an Out-pointer in device memory, and that update is copied to a shadow out-pointer in host memory. A processor in the network device may then execute the IOCBs to move data between the host device and the network (in either direction as specified in the IOCB).

The subject matter of this disclosure may be better understood by reference to FIGS. 1-4.

FIG. 1 is a block diagram showing a network controller device 101 in accordance with implementations of the subject matter of this disclosure, linked to a host device 102 by a PCIe link 103. Network controller 101 includes a channel interface 111 having a processor (CPU) 121 for executing IOCBs 141 stored in memory 131, for moving data between channel medium 104 and host device 102, via host interface 161. Host device 102 includes host memory 112 which houses IOCB request queue 122 which, as drawn includes 256 slots numbered 0, . . . , 255. Host device 102 also includes processor 142 for executing one or more user applications 152 and software drivers 162.

Figure 2:
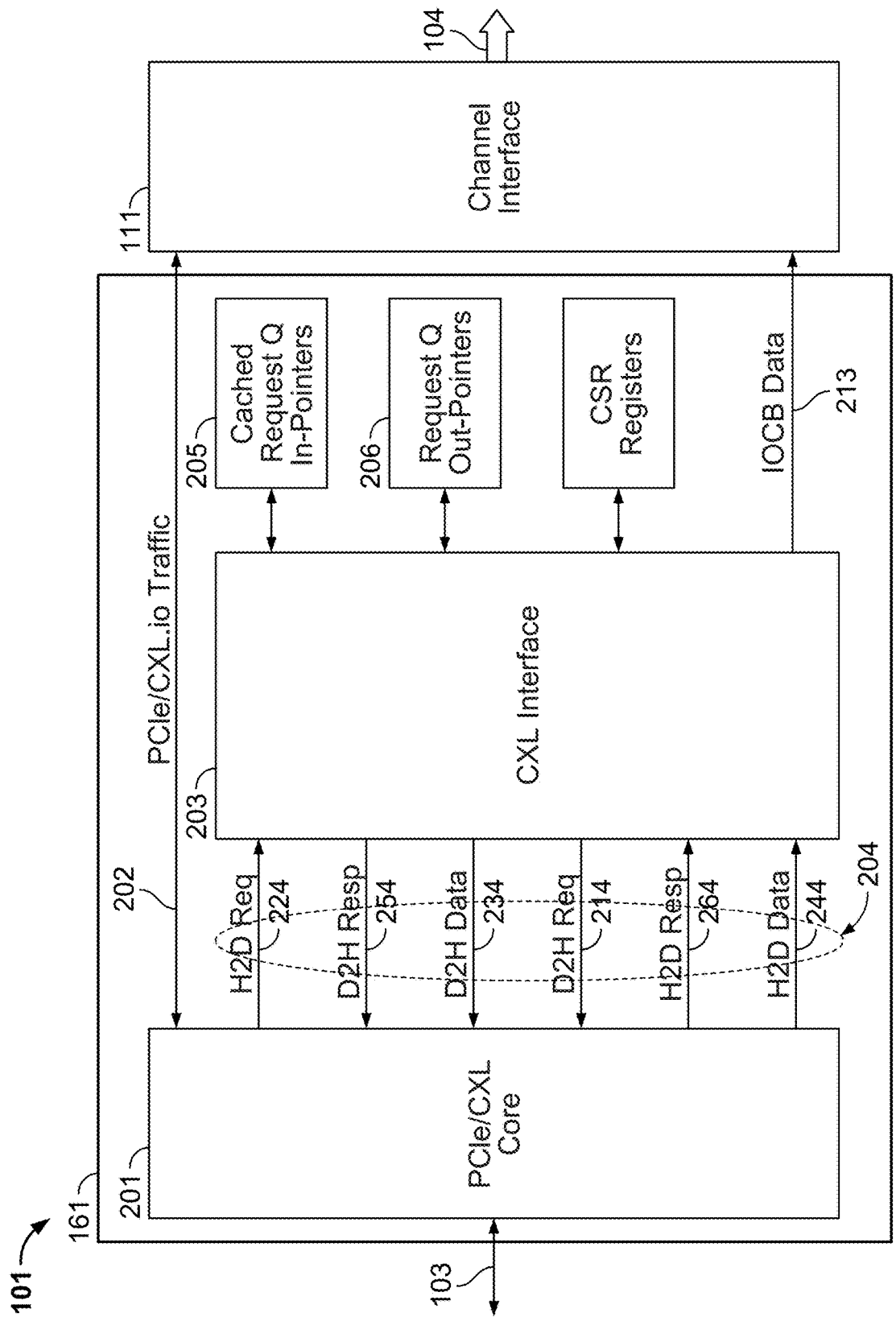
FIG. 2 is a block diagram of a network controller device in accordance with implementations of the subject matter of this disclosure, such as the network controller of FIG. 1, showing more detail of a host interface.
Figure 3:
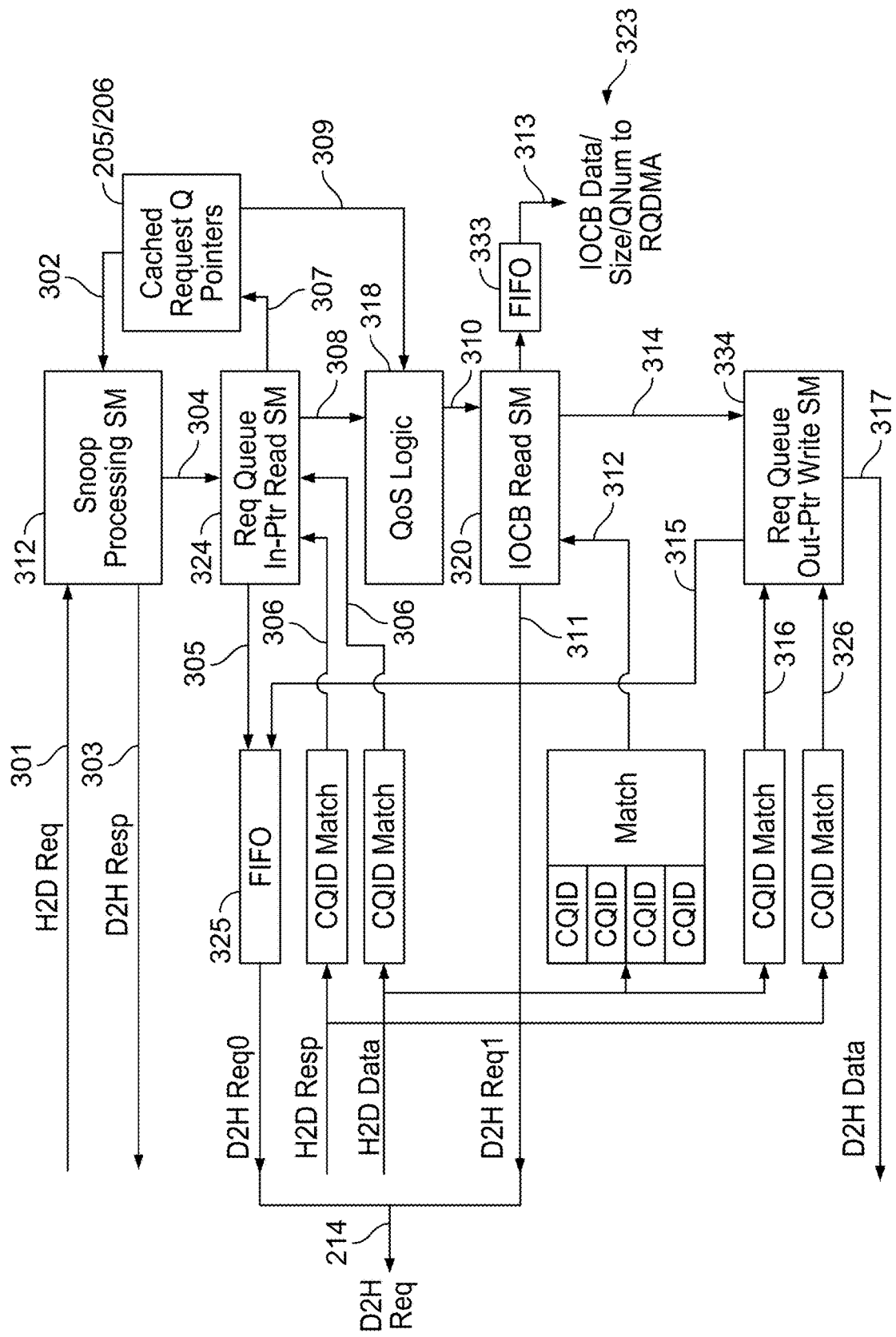
FIG. 3 is a state diagram of illustrating operation of the host interface of FIG. 2.

FIG. 2 shows an implementation of network controller 101 with more detail of host interface 161. A PCIe/CXL core 201 controls data transport between network controller 101 and host device 102, via PCIe link 103, overlain in this implementation with the CXL protocol. Data traffic resulting from execution of IOCB requests is transported between channel interface 111 and PCIe/CXL core 201 by PCIe link 202, overlain in this implementation with the CXL.io extension of the CXL protocol.

Transport of the IOCB requests themselves is handled by CXL interface 203, which delivers IOCB data at 213 to channel interface 111, and communicates with host device 102, through PCI/CXL core 201, over CXL.cache link 204, which includes six independent unidirectional channels that are used to communicate between host device 102 and network controller 101. There are two request channels—a Device-to-Host (D2H) request channel 214 and a Host-to-Device (H2D) request channel 224, two data channels—a D2H data channel 234 and an H2D data channel 244, and two response channels—a D2H response channel 254 and an H2D response channel 264.

D2H request channel 214 may be used by network device 101 to send snoop requests and read/write requests to host device 102. H2D request channel 224 may be used by host device 102 to send snoop invalidate request messages to network device 101. D2H data channel 234 may be used to transfer data from network device 101 to host device 102. H2D data channel 244 may be used to transfer data from host device 102 to network device 101. D2H response channel 254 may be used by network device 101 to send snoop responses to host device 102. H2D response channel 264 may be used by host device 102 to send response messages to network device 101 as described below.

As noted above, IOCBs may be processed, in implementations of the subject matter of this disclosure, by having network device 101 snoop request queue 122 as though it were a cache. Thus, after host device 102 writes one or more IOCBs to request queue 122 in host memory 112, host device 102 updates the request queue In-pointer or In-pointers in host memory 112. Network device 101, which has snooped a "cache" line associated with request queue 122 (thereby treating request queue 122 as a cache), is notified via the snoop invalidate request message that the request queue In-pointer has been modified and the new pointer value must be read. The new pointer value is read with a read request from the device to the host on D2H request channel 214, and the host returns the new in-pointer value to the device on H2D data channel 244. Network device 101 then pulls the IOCB or IOCBs from request queue 122 in host memory 112. The transfer may occur using the CXL.cache extension. Network device 101 then updates an Out-pointer in its memory at 206, and that update is copied to a shadow out-pointer in host memory 112. Processor 121 in network device 101 may then execute the IOCBs to move data between host device 102 and the network (in either direction as specified in the IOCB) at 104.

In operation, host device 102 may build an IOCB, write the IOCB into request queue 122 in host memory 112 and then update a request queue In-pointer after each IOCB has been written into the request queue 122. Alternatively, host device 102 may queue multiple IOCBs at one time and then write the request queue In-pointer only once after all IOCBs have been written into request queue 122. Request queue In-pointers, signaling IOCBs to be processed, may be stored or cached in host memory 112, and at 205 in host interface 161 of network device 101. Request queue Out-pointers, signaling that IOCBs have been processed, may be stored or cached in host memory 112, and at 206 in host interface 161 of network device 101.

In one implementation, once a request queue has thereby been established, at 301 (FIG. 3), when host device writes the request queue In-Pointer, cache logic in host device 102 sends a snoop invalidate request message to network device 101 over the H2D request channel 224 indicating the In-Pointer value has changed. This replaces the doorbell write operation used in typical implementations, except that the snoop invalidate request message is issued automatically because request queue 122 is treated, in accordance with implementations of the subject matter of this disclosure, as though it were a cache.

At 302, snoop processing state machine 312 of network device 101 checks the address of the snoop invalidate request message to see if it matches a Host Physical Address (HPA) of one of the request queue In-pointers stored at 205. If the address in the snoop invalidate request message does not match an HPA of one of the request queue In-pointers stored at 205, then network device 101 sends a response message to that effect to host device 102 over the D2H response channel 254.

If the address in the snoop invalidate request message does match an HPA of one of the request queue In-pointers stored at 205, then at 303 network device 101 sends a response message to the host device 102 over the D2H response channel 254, and then, at 304, because there was an HPA match, network device 101 sends the identification of the relevant request queue In-pointer to the Request Queue In-Pointer Read state machine 324.

At 305, network device 101 sends a Read Shared request message on D2H request channel 214 to read the new value of the request queue In-pointer. The request is sent with a specific CQID number, which identifies the request and will be returned by host device 102 in all related response and/or data messages.

At 306, host device 102 sends back both a data message and a response message for the request queue In-pointer operation on the H2D data channel 244 and the H2D response channel 264, tagged with the appropriate CQID number. These messages can be returned in any order, but the operation is not considered complete until network device 101 has received both the data message and the response message. The data message and the response message are routed to the Request Queue In-Pointer Read state machine 324 using the CQID number sent in the original request.

At 307, network device 101 saves the new value of the request queue In-pointer as cached data, insofar as network device 101 performed a Read Shared operation to read the pointer.

Quality of Service (QoS) logic ensures that all request queues are serviced in a timely manner, and that a single queue does not monopolize the interface. To that end, at 308, network device 101 sets a Quality of Service bit in a flag vector for the Queue Number that the pointer value was just updated for (there is one bit for each queue in the vector). If all the bits in the QOSB vector are equal to zero, then network device 101 copies the flag vector into the QOSB vector and clears the flag vector. The QoS state machine 318 monitors the QOSB vector, and when the QOSB vector is not equal to zero, QoS state machine 318 processes each queue that has a QOSB vector bit set, representing an IOCB requiring processing.

At 309, network device 101 determines the number of IOCBs to read based on the request queue In-pointers and Out-pointers or the Queue QoS Max Count, whichever is less. That is, to maintain an equitable distribution of resources among the various queues, if there are other queues waiting, each queue will receive only a certain number (QoS Max Count) of IOCBs at a time.

At 310, if the number of IOCBs to be read is greater than zero, then the queue number and IOCB read count are queued to the IOCB Read state machine 320. If the number of IOCBs to be read is zero then the queue is suspended and the flag vector bit is set for the current queue number. Also, if the number of IOCBs to be read is less than the difference between the request queue In-pointer and the request queue Out-pointer, then the flag vector bit for the current queue number is set indicating additional IOCBs need to be fetched.

At 311, IOCB Read state machine 320 sends at least one Read Current request over D2H request channel 214, with a unique CQID number for each request. The number of requests depends on the size of the IOCB, because the CXL.cache protocol can transfer a maximum of 64 bytes of data in one request. For example, there may be one, two or four Read Current requests for IOCBs of size 64, 128 or 256 bytes.

At 312, the IOCB data is returned by host device 102 on H2D data channel 244, and because the operation was a Read Current operation, there are no response messages sent by host device 102. The CQID numbers are used to route the data messages to IOCB Read state machine 320 and also to assemble the IOCB data in the correct order.

At 313, after receiving all the messages that contains IOCB data, IOCB Read state machine 320 routes the IOCB data, queue number and IOCB size information, to the request queue DMA module at 323 through a FIFO 333. If additional IOCBs need to be read for the current queue number, then IOCB Read state machine 320 will return to 312.

Otherwise, at 314, after all the IOCBs have been read, IOCB Read state machine 320 will send the queue number and the total Number of IOCBs read to the Request Queue Out-Pointer Write state machine 334.

At 315, Request Queue Out-Pointer Write state machine 334 issues a Read to Own request message for the Out-Pointer cache line to host device 102 via FIFO 325 onto the D2H request channel 214 with a specific CQID so the returned messages can be routed correctly.

Host device 102 responds to the Read to Own request with both a response message 316 on H2D response channel 264 and a data message 326 on H2D data channel 244. Both messages 316, 326 contain the CQID from the original request so the messages will be correctly routed to Request Queue Out-Pointer Write state machine 334. The read operation is complete when both messages 316, 326 have been received by network device 101.

At 317, Request Queue Out-Pointer Write state machine 334 updates the request queue Out-Pointer with the number of IOCBs that were previously transferred and saves the value as a local copy at 206 (FIG. 2). In addition, Request Queue Out-Pointer Write state machine 334 issues a Dirty Evict request message on D2H request channel 214 to force the write of the new Out-Pointer value to host memory 112. When host device 102 receives the Dirty Evict request it sends a GO-WritePull response message on H2D response channel 264 which causes Request Queue Out-Pointer Write state machine 334 to send the new Out-Pointer data to the host on D2H data channel 244, and this implementation ends.

Figure 4:
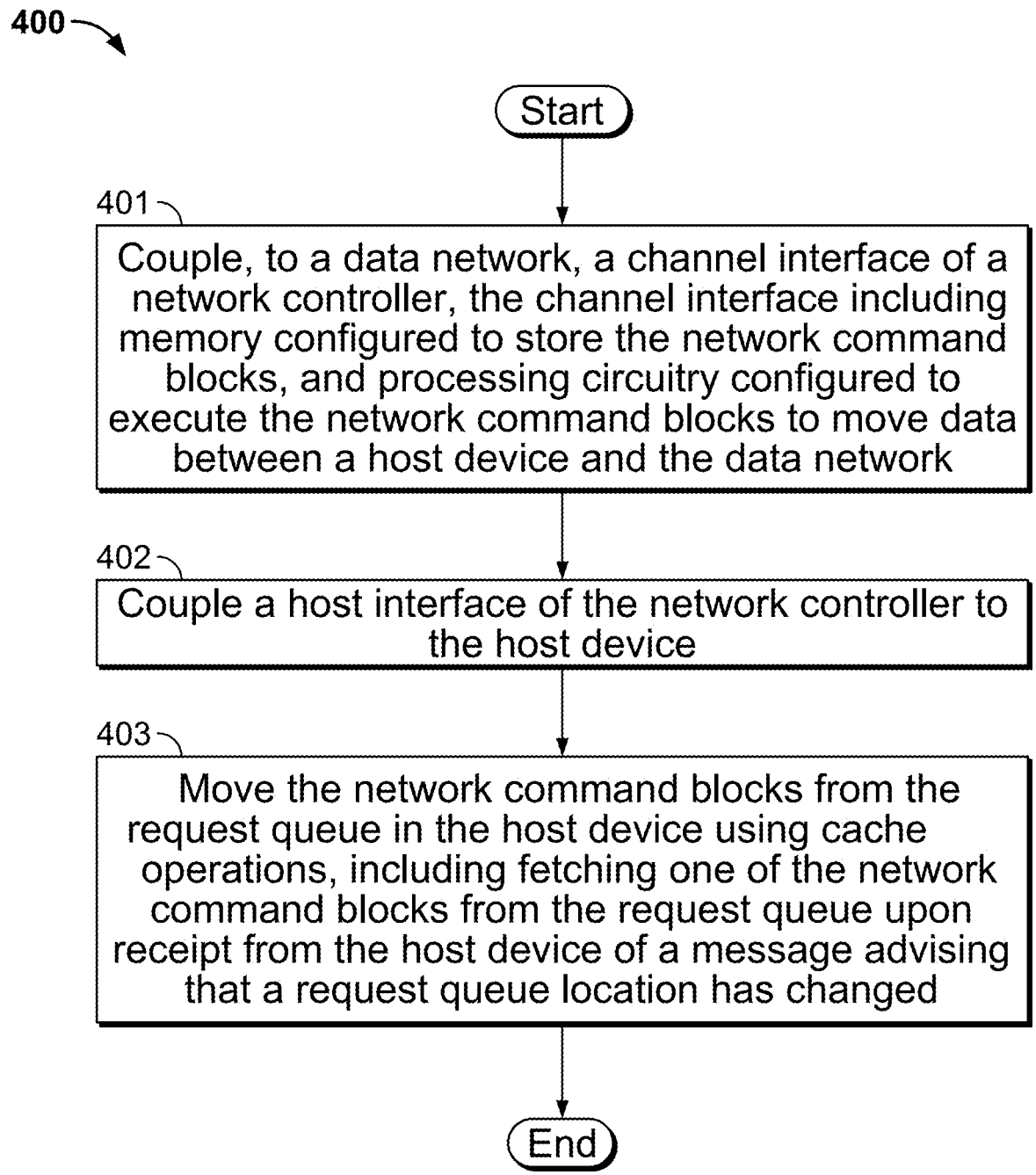
FIG. 4 is a flow diagram illustrating a method in accordance with implementations of the subject matter of this disclosure.

More generally, a method 400 according to implementations of the subject matter of this disclosure is diagrammed in FIG. 4. Method 400 begins at 401, where a channel interface of a network controller is coupled to a data network, the channel interface including memory configured to store network command blocks, and processing circuitry configured to execute the network command blocks to move data between a host device and the data network.

At 402, a host interface of the network controller is coupled to the host device.

At 403, network command blocks are moved from the host device to the memory using the host interface, by treating the request queue in the host device as a request cache, including fetching one of the network command blocks from the request queue upon receipt from the host device of a message advising that a request queue location has changed, and method 400 ends.

Thus it is seen that a network device that uses cache techniques to receive notifications from a host that the host has input/output control commands for the network device, thereby reducing command traffic, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A network controller for coupling a host device to a data network in accordance with network command blocks initiated in a request queue in the host device, the network controller comprising:
    a channel interface configured to couple to the data network, the channel interface including memory configured to store the network command blocks, and processing circuitry configured to execute the network command blocks to move data between the host device and the data network; and
    a host interface configured to couple the network controller to the host device, and to move the network command blocks from the request queue in the host device to the memory using cache operations, including:
    maintaining cached In-pointers corresponding to locations in the host device request queue;
    issuing a cache snoop command to the host device request queue; and
    fetching one of the network command blocks from the request queue upon receipt from the host device of a cache snoop invalidation request message advising that one of the cached In-pointers has been changed, meaning that a request queue location has changed.

2. The network controller of claim 1 wherein the host interface is configured to receive from the host device one or more cache snoop invalidation request messages signifying that a plurality of the cached In-pointers have been changed, and to fetch a corresponding plurality of the network command blocks.

3. The network controller of claim 1 wherein:
    the host interface is further configured to maintain Out-pointers corresponding to network command blocks that have been transferred; and
    the host interface is configured to, upon completion of a transfer of a network command block, update, in the Out-pointers, an Out-pointer corresponding to the network command block that was transferred.

4. The network controller of claim 3 wherein the host interface is further configured to update additional Out-pointers in the host device.

5. The network controller of claim 1 wherein the host interface is configured to operate under a cache protocol.

6. The network controller of claim 5 wherein the host interface is configured to operate under a CXL.cache protocol.

7. A method of operating a network controller to couple a host device to a data network in accordance with network command blocks initiated in a request queue in the host device, the method comprising:
    coupling a channel interface of the network controller to the data network, the channel interface including memory configured to store the network command blocks, and processing circuitry configured to execute the network command blocks to move data between the host device and the data network;
    coupling a host interface of the network controller to the host device; and
    moving the network command blocks from the request queue in the host device to the memory using cache operations, including:
    maintaining cached In-pointers corresponding to locations in the host device request queue;
    issuing a cache snoop command to the host device request queue; and
    fetching one of the network command blocks from the request queue upon receipt from the host device of a cache snoop invalidation request message advising that one of the cached In-pointers has been changed, meaning that a request queue location has changed.

8. The method of claim 7 comprising:
    fetching a plurality of the network command blocks upon receipt from the host device of one or more cache snoop invalidation request messages signifying that a plurality of the cached In-pointers have been changed.

9. The method of claim 7 comprising:
    maintaining at the host interface Out-pointers corresponding to network command blocks that have been transferred; and
    upon completion of a transfer of a network command block, updating, in the Out-pointers, an Out-pointer corresponding to the network command block that was transferred.

10. The method of claim 9 further comprising updating additional Out-pointers in the host device.

11. The method of claim 7 comprising operating the host interface under a cache protocol.

12. The method of claim 11 comprising operating the host interface under a CXL.cache protocol.

13. A network system comprising:
    a host device configured to initiate network command blocks and to store the network command blocks in a request queue in the host device; and
    a network controller for coupling the host device to a data network in accordance with the network command blocks, the network controller comprising:
    a channel interface configured to couple to the data network, the channel interface including memory configured to store the network command blocks, and processing circuitry configured to execute the network command blocks to move data between the host device and the data network, and
    a host interface configured to couple the network controller to the host device, and to move the network command blocks from the request queue in the host device to the memory using cache operations, including:
    maintaining cached In-pointers corresponding to locations in the host device request queue;
    issuing a cache snoop command to the host device request queue; and
    fetching one of the network command blocks from the request queue upon receipt from the host device of a cache snoop invalidation request message advising that one of the cached In-pointers has been changed, meaning that a request queue location has changed.

14. The network system of claim 13 wherein:
the host device is configured to, upon entering a plurality of new network command blocks into the host device request queue, send to the host interface a corresponding plurality of cache snoop invalidation request messages, each respective cache snoop invalidation request message indicating that a respective one of the cached In-pointers has been changed; and
the host interface is configured to fetch a corresponding plurality of the network command blocks upon receipt from the host device of the plurality of cache snoop invalidation request messages.

15. The network system of claim 13 wherein the host interface operates under a cache protocol.

16. The network system of claim 15 wherein the host interface operates under a CXL.cache protocol.

\* \* \* \* \*